J. ERICKSON.
UNIVERSAL JOINT.
APPLICATION FILED APR. 14, 1913.

1,200,175.

Patented Oct. 10, 1916.

WITNESSES
B. Garber
J. E. Cooley

INVENTOR:
John Erickson
Edward Feles
ATTORNEY.

UNITED STATES PATENT OFFICE.

JOHN ERICKSON, OF CHICAGO, ILLINOIS.

UNIVERSAL JOINT.

1,200,475.  Specification of Letters Patent.  Patented Oct. 10, 1916.

Application filed April 14, 1913. Serial No. 760,968.

*To all whom it may concern:*

Be it known that I, JOHN ERICKSON, a citizen of the United States of America, and resident of Chicago, in the county of Cook and State of Illinois, have invented certain new and useful Improvements in Universal Joints, of which the following is a specification.

The present invention relates to universal joints, and while particularly adapted for use in power transmission and automobiles, it will be apparent, after a consideration of the specification, that the joint may be advantageously used in other structures where universal joints may be applied.

Among the objects of my invention are the following: to provide an improved universal joint, the principal rubbing surfaces of which are completely inclosed, which incasement may be completely or approximately filled with a lubricating medium; to provide an improved clamping member for holding the joint together and to provide in connection therewith a packing which will prevent leakage of the lubricating fluid, and to provide certain other details of improvements tending to increase the efficiency and serviceability of a universal joint.

Figure 2:
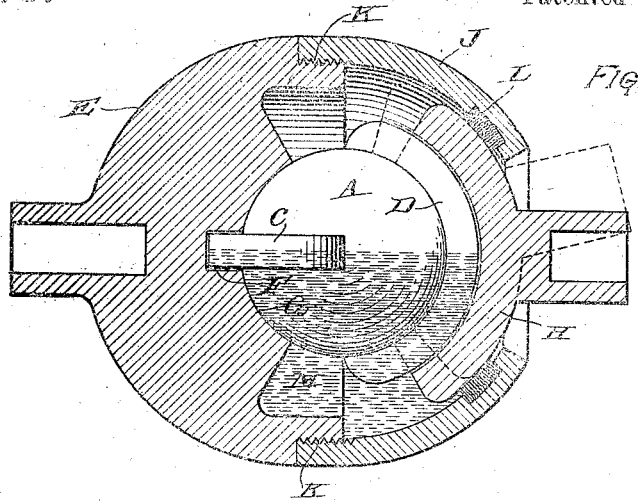
Figure 1:
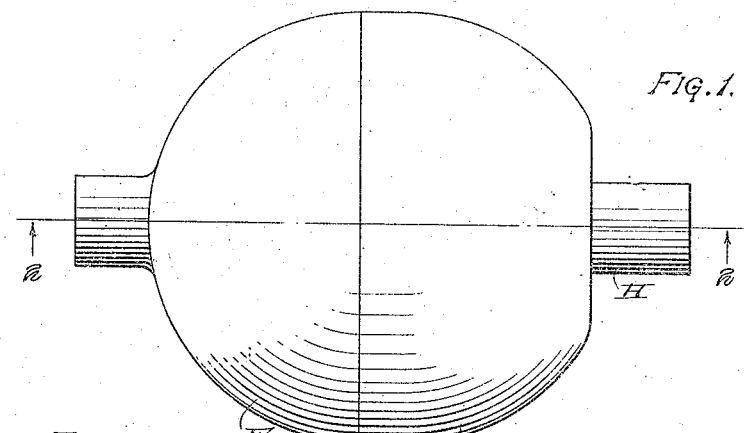
Figure 3:
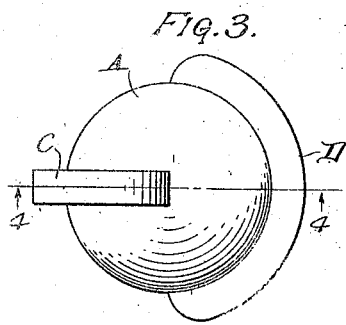
Figure 4:
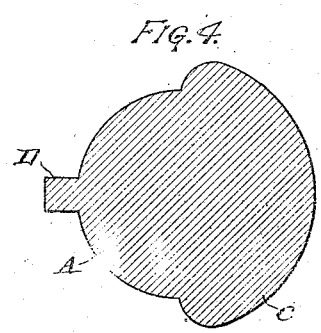

In the drawings, Figure 1 shows the joint in side elevation assembled. Fig. 2 is a section shown on line 2—2, Fig. 1. Fig. 3 is the central ball upon which the movements of the joint hinge. In Fig. 4 is a section on line 4—4, Fig. 3.

The ball A is provided with two crest flanges C and D. The cup E is provided with a groove F and a seat G, which mesh with the ball-surface and flange F, as shown in Fig. 2. The cup H is provided with a similar groove and seat, which are meshed similarly with the flange D and with the ball-surface. When these cups E and H are in position, as shown in Fig. 2, they are locked so as shown by the semi-spherical collar J, which is screwed onto the cup E, the engaging thread being shown at K. The collar J is provided with a packing ring L, which plays upon the back surface of the cup H, and which prevents any leakage of the oil or other lubricating medium contained within the hollow section M, formed by the cups E, H and the cap J.

What I claim as my invention is:

1. In a joint, a pair of socket members, a pivot ball common to said socket members, and means disconnected from said ball for holding said members and ball in operative engagement, said means comprising a cap over one of said members in sliding engagement therewith and permanently fixed to the other for holding said members in operative engagement with said ball, said cap disconnected from said ball, said ball and members interlocked whereby one member may drive the other through the ball.

2. In a joint, a pair of socket members, a pivot ball common to said socket members, and means disconnected from said ball for holding said members and ball in operative engagement, said means comprising a cap over one of said members in sliding engagement therewith and permanently fixed to the other for holding said members in operative engagement with said ball, said cap movable relative to said ball, said ball and members interlocked whereby one member may drive the other through the ball.

3. A universal joint consisting only of the following elements: a pivot member, a socket member having a groove, a second socket member having a groove, a cap inclosing one socket and fixed to the other and a packing ring, each element being a separate unitary structure, each element except the cap and packing ring movable relative to every other, said ball provided with a tongue for each groove for restricting the movements of the members.

JOHN ERICKSON.

Witnesses:
J. E. COOLEY,
C. A. GREGORY.